United States Patent [19]
Bradley

[11] 3,900,660

[45] Aug. 19, 1975

[54] MANUFACTURE OF SILICON METAL FROM A MIXTURE OF CHLOROSILANES

[75] Inventor: Howard B. Bradley, St. Mary's, W. Va.

[73] Assignee: Union Carbide Corporation, New York, N.Y.

[22] Filed: Jan. 11, 1974

[21] Appl. No.: 432,438

Related U.S. Application Data

[63] Continuation of Ser. No. 282,108, Aug. 21, 1972, abandoned, which is a continuation of Ser. No. 81,835, Oct. 19, 1970, abandoned.

[52] U.S. Cl.................................. 427/248; 423/350
[51] Int. Cl............................................. C23c 11/06
[58] Field of Search......... 117/106 A, 107.2 R, 201; 423/350

[56] References Cited

UNITED STATES PATENTS

| | | | |
|---|---|---|---|
| 2,938,772 | 5/1960 | Enk et al. .................... | 117/106 A X |
| 3,057,690 | 10/1962 | Reuschel et al. ............ | 117/106 A X |
| 3,160,521 | 12/1964 | Ziegler et al........................ | 117/213 |
| 3,745,043 | 7/1973 | Bradley....................... | 117/106 A X |
| 3,824,121 | 7/1974 | Bradley et al.................... | 117/106 A |

*Primary Examiner*—Ralph S. Kendall
*Assistant Examiner*—Harris A. Pitlick
*Attorney, Agent, or Firm*—G. A. Skoler

[57] ABSTRACT

A high yield process for making polycrystalline silicon metal suitable for semiconductor usage which involves vapor phase decomposition of a mixture of dichlorosilane and trichlorosilane.

1 Claim, 1 Drawing Figure

PATENTED AUG 19 1975　　3,900,660
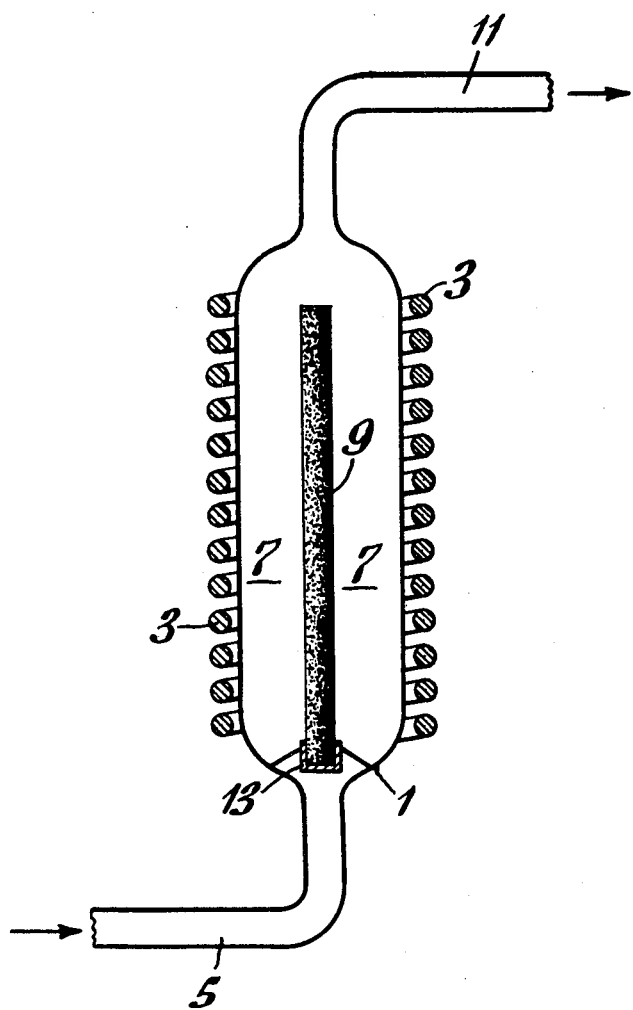
INVENTOR.
HOWARD B. BRADLEY
BY George A. Stoter
ATTORNEY

MANUFACTURE OF SILICON METAL FROM A MIXTURE OF CHLOROSILANES

This is a continuation, of application Ser. No. 282,108 filed Aug. 21, 1972, and now abandoned which was a continuation of application Ser. No. 81,835, filed on Oct. 19, 1970 and now abandoned.

SUMMARY OF THE INVENTION

This invention relates to the production of silicon metal from a mixture of trichlorosilane and dichlorosilane by the reduction and decomposition of same. More particularly, the invention is concerned with providing in a reduction zone for the conversion of trichlorosilane to silicon metal a sufficient amount of dichlorosilane whereby to increase the yield of silicon metal over that which is obtainable from the reduction and decomposition of trichlorosilane alone. The silicon metal finds utility in the manufacture of semiconductor and electrical devices.

BACKGROUND OF THE INVENTION

Polycrystalline and epitaxial silicon metals employed in semiconductor usage are typically produced by the reduction and decomposition of silicon tetrachloride, trichlorosilane and/or silane. These silicon containing compounds are typically mixed with large concentrations of hydrogen gas and reacted at activation temperatures sufficient to effect reduction and decomposition thereof thereby to deposit silicon metals by such reaction on substrates in the reaction zone. In the case of polycrystalline metal, essentially all of such is produced by the reduction of trichlorosilane. Initially, the art employed silicon tetrachloride in commercial practice as the starting material. However, the efficiencies in and yields effected by decomposition and reduction of silicon tetrachloride were extremely poor. The art investigated the use of trichlorosilane instead, and found that trichlorosilane provided many advantages over silicon tetrachloride. First, one could obtain higher yields of silicon metal from trichlorosilane. Second, it was found that trichlorosilane decomposed and reduced at lower temperatures. Though trichlorosilane is substantially more volatile than silicon tetrachloride and more susceptible to explosive reaction, its stability is sufficient to allow its ready usage in the manufacture of silicon meal with substantial safety. To date, little usage of silane in the manufacture of polycrystalline silicon metal has been effected commercially, though substantial interest in the use of silane for making epitaxial silicon metal appears to be developing.

The growth of the market for semiconductor devices made from silicon metal has been significant in recent years. The rate of growth of the silicon metal industry has been so rapid that every few years the manufacturers find it necessary to expand their facilities for producing the product. Since the capital investment in plant expansion must be paid for out of profits from the silicon metal produced, it is necessary for the manufacturer to either increase the cost of the silicon metal product to obtain payback of his capital expenditures or accept lower profits until payback has been achieved.

Another problem which besets the silicon metal producer is developing sufficient capacity of the silicon metal production in his operation to meet the surges which occasionally take place in the marketplace for silicon metal product. When the demand for silicon metal exceeds the producer's capacity, then the price of silicon metal increases in response to the shortage of metal available in the marketplace for conversion to semi-conductor devices.

These problems can be resolved if the yield of silicon metal obtainable by the reduction of a silicon containing compound such as trichlorosilane can be adjusted to meet market demands. Substantial research in improving the yield of silicon metal from the decomposition and reduction of trichlorosilane shows that the maximum yields obtainable in a multi-pass operation is at best 40 mole-percent based on the moles of Si in the trichlorosilane reactant. This last figure represents an optimistic one and the yields usually obtained on a multi-pass operation are on the order of about 37 mole-percent. On a single pass basis, the yields of silicon metal obtained by the decomposition of trichlorosilane is at best in the order of 15 – 27 percent.

Heretofore, there was no known method by which one could increase the yields of silicon metal obtained when trichlorosilane was the reactant. Therefore, the silicon metal producer could not alter the chemistry of his process but had to look to increasing the amount and size of equipment to effect greater production. Since development and installation of such equipment takes time, the increase in capacity must be decided upon at a time far in advance of the market demands for increased amounts of silicon metal.

There is described herein a method of increasing silicon metal production over that which is obtainable from the decomposition of trichlorosilane as the sole silicon producing material. The process of this invention can be effected wherein trichlorosilane is the primary silicon metal producing material or is the secondary silicon metal producing material. An advantage of the process of this invention resides in the fact that the production of silicon metal can be effected utilizing in combination with trichlorosilane a material which does not require alteration of the geometry or conditions of the reaction to provide excellent yields of high quality silicon metal. This process is accomplished by providing in the reduction and decomposition zone with the trichlorosilane a sufficient amount of dichlorosilane whereby the yield of silicon metal produced based upon the silicon content of the trichlorosilane and dichlorosilane employed is greater than would be obtainable when using trichlorosilane alone as the silicon metal producing material. Thus, employing the process of this invention it is possible to obtain yields in a single pass of silicon metal greater than 40 percent, even greater than 50 percent, based on the moles of silicon provided in the reactants. On a single pass basis it is possible to obtain yields better than those described previously for a multi-pass operation in silicon metal production where trichlorosilane is the sole silicon producing material. This invention distinguishes from other efforts in this field in that there is provided in the reaction zone a mixture of two specific chlorosilanes, that is, a mixture of dichlorosilane and trichlorosilane. The amount of dichlorosilane employed must be sufficient to provide an increase in the yield of silicon metal.

Thus it is possible that in practicing the process of this invention one can increase materially the silicon metal producing capacity of a given commercial reactor without having to increase the concentration of materials fed to the reactor and thereby altering the chemical reactions occurring therein. Another advantage is that one need not change the geometric configuration of the reactor for the purpose of handling different materials since dichlorosilane performs as well as trichlorosilane in the production of silicon metal in the conventional silicon metal reactors used commercially wherein trichlorosilane is the raw material. Since dichlorosilane is a higher priced material and is not readily available, but can be produced in small amounts, it is possible to utilize dichlorosilane in the manufacture of silicon metal, not as a sole raw material for such manufacture, but as an additive which one employs on those occasions where increased production is desirable. This allows the manufacturer to meet the surges in the demand for the metal without changing the cost of making the metal and at the same time alleviate the shortage conditions which drive up prices.

Thus this invention encompasses the periodic, continual, continuous or intermittent inclusion of dichlorosilane in the reduction and decomposition zone wherein trichlorosilane is converted to silicon metal whereby to improve the yield of silicon metal over that which is obtainable when trichlorosilane is used alone. This means that the dichlorosilane may be introduced to the reaction zone as a replacement for part of the trichlorosilane or in addition to the usual amount of trichlorosilane which is fed to the reduction and decomposition zone. In the last case, where dichlorosilane is added to the usual amount of trichlorosilane the yield of silicon metal obtained is not only greater than the yields of silicon metal obtainable from trichlorosilane alone but on a proportion basis the yield is greater than would be the case if the extra amount of chlorosilane fed to the reduction and decomposition zone were wholly trichlorosilane. The amount of dichlorosilane which is provided in the reduction and decomposition zone in combination with trichlorosilane may be that amount, which under the particular conditions in which reduction and decomposition is being effected, is sufficient to effect the aforementioned increase in yield of silicon metal.

Typically, the amount of dichlorosilane which is provided is from about 1 mole-percent up to about 80 mole-percent of the chlorosilanes fed to the reduction and decomposition zone, basis the amount of chlorosilanes employed in effecting the manufacture of silicon metals. In the preferred practice of this invention, the amount of dichlorosilane fed to the reduction and decomposition zone ranges from about 5 mole-percent to about 70 mole-percent.

In the usual conversion of trichlorosilane to silicon metal, substantial quantities of hydrogen gas are provided in the reaction zone. It is generally believed that the hydrogen gas is a necessary reactant in order to effect total conversion of trichlorosilane into silicon metal by sequestering the chlorine by-product as HCl. In the usual practice, the excess hydrogen gas, determined on a mole basis, is typically at least about 20 times that of the silicon starting material. The process of the present invention may be effected in the same manner, that is, with an excess of hydrogen gas as is typically employed. The amount of hydrogen gas employed will, of course, be dependent upon the geometry of the reduction and decomposition zone, the temperature employed, the feed rates of reactants, and the like considerations.

It is quite understandable that the more hydrogen that is required in effecting the reaction, the more expensive is the reaction. For example, with each mole increase of gas, either one increases the velocity of the reaction in terms of gas flow through the reactor or one increases the size of the reactor. In any event, either situation results in higher cost since increased velocity requires greater recycle facilities and greater pumping capacity not to mention an increase in the size and cost of the condensors which are employed subsequent to the reactor in which reduction and decomposition is effected. Compounding this problem is the fact that the silicon starting material has to be extremely pure containing no more than fractional parts per billion (on a weight basis) of undesirable impurities. This means that hydrogen gas must be made extremely pure. Such pure hydrogen is exceedingly more expensive than the garden variety commercial hydrogen gas available in the open market.

An advantage of this invention is that one may increase the total concentration of chlorosilane fed to the reduction and decomposition zone wherein the increased amount of chlorosilane over that previously employable is in the form of dichlorosilane. It has been found that when dichlorosilane is fed to the reduction zone in which trichlorosilane is being decomposed, the concentration of chlorosilanes may constitute more than 5 percent, preferably at least 6 percent, and typically not more than about 30 percent of the moles of gas fed to the reduction and decomposition zone. In addition, it is possible to replace some of the hydrogen gas with inert gases such as nitrogen and argon.

Thus the use of dichlorosilane not only increases the yield of silicon metal product obtained but also increases the concentration of the reactants fed to the reduction and decomposition zone whereby to allow one to decrease the cost in reactor size, condensers employed in separation of by-products after the reactor and many other like factors.

The reduction and decomposition of the mixture of trichlorosilane and dichlorosilane is effected in admixture with gases, principally hydrogen gas. This can be effected in the usual manner by feeding a mixture of the reactants plus the carrier gas to the reduction and decomposition zone. Thus, trichlorosilane in admixture with dichlorosilane and hydrogen gas, as the principal or only components, can be fed to a reactor which contains therein a hot surface onto which the metal is deposited. The surface upon which decomposition is effected may be a rod heated by either resistance or induction means to the temperature at which decomposition and reduction is effected to produce polycrystalline silicon or a silicon device surface whereby to produce epitaxial silicon. The temperature of the rod or other surface in the reaction zone is sufficiently high to effect decomposition and reduction of trichlorosilane to silicon metal up to a temperature at which the resulting metal product begins to soften. Typically, the reaction temperature may range as low as about 750°C. to a high as about 1,400°C., though usually temperatures of at least about 850°C. to about 1,300°C. are more favorable. Preferably, the temperature which the decomposition and reduction reaction is most effective is about 900°C. up to about 1,250°C.

In order to more specifically describe the process of this invention, reference is made to the drawing which illustrates a reactor in which the experiments set forth in the Example below were effected. In the drawing, reactor 1 is a quartz glass cylinder with tapered ends terminating into feed tube 5 and exit tube 11. The cylindrical length of reactor 1 is 30 centimeters and its inside diameter is 4 centimeters. Circumscribing the cylindrical portion of reactor 1 is an induction coil 3 connected to a 5kw high frequency induction heating unit. Inserted along the central axis of the interior of reactor 1 is a thin graphite rod 9 having a 0.6 centimeter diameter upon which is deposited the silicon metal during use of reactor 1. Rod 9 is held in position by rod holder 13. The rod temperature can be measured by a pyro-micro-optical pyrometer.

During use, reactor 1 is heated by induction coil 3 to cause rod 9 to be brought to the temperatures indicated. The dichlorosilane, trichlorosilane and hydrogen feed gases are mixed prior to introduction into feed tube 5. The off gases of the reaction are collected from tube 11 in a condenser system.

EXAMPLE I

Dichlorosilane gas was dissolved in trichlorosilane liquid and by sparging hydrogen gas through the liquid, the mixture was introduced to the 370 ml quartz glass reactor containing the graphite rod positioned in the center of the reactor and heated inductively by an RF Coil surrounding the reactor, as depicted in the drawing and described above. The graphite rod temperature was 1,050°C and the hydrogen flow rate was 400 cc's/min. The composition of the inlet gas was 9.7 mole-percent dichlorosilane, 16.9 mole-percent trichlorosilane, the remainder being hydrogen gas, and 34 mole-percent of the silicon in the feed was reduced to metallic silicon on the rod.

EXAMPLE II

Using the same reactor, with the graphite rod temperature at 1,050°C and the hydrogen flowing at 1,600 ml/min.; an inlet gas mixture of 6.1 mole-percent dichlorosilane and 14.2 mole-percent trichlorosilane, the remainder being hydrogen gas, was fed to the reactor. 34 mole-percent of the silicon in the feed was reduced in metallic silicon on the graphite rod.

EXAMPLE III

Repeating the preceding procedure, using 1,050°C rod temperature and 1600 ml/min. hydrogen flow, a feed gas composition of 2.2 mole-percent dichlorosilane and 4.1 mole-percent of trichlorosilane, there was obtained a yield of 61 mole-percent of the silicon in the feed reduced to metallic silicon on the rod.

EXAMPLE IV

In this example, only trichlorosilane was carried in the hydrogen feed to the above-described reactor. The graphite rod was maintained at 1,100°C throughout the experiment and the hydrogen flow-rate was 330 ml/min. and the trichlorosilane concentration in the feed was 31 mole-percent. Only 16.8 mole-percent of the silicon in the feed was reduced to metallic silicon on the graphite rod.

EXAMPLE V

Example IV was repeated except that the concentration of trichlorosilane in the feed gas was only 3 percent. The silicon yield as indicated by the deposit on the rod was 25 percent.

What is claimed is:

1. The process for making polycrystalline silicon metal of semiconductor quality which comprises providing a gaseous chlorosilane mixture of dichlorosilane and trichlorosilane in combination with hydrogen gas in a reactor containing a hot deposition surface at a temperature of about 850°C. to about 1,300°C., causing decomposition of dichlorosilane and trichlorosilane in said reactor and depositing such as polycrystalline metal on said hot deposition surface, and the amount of dichlorsilane in said mixture comprises from about 5 mole percent to about 70 mole percent thereof and the chlorosilane mixture comprises 5 percent to 30 percent of the moles of the combination of said mixture and hydrogen provided in said reactor.

* * * * *

UNITED STATES PATENT OFFICE
CERTIFICATE OF CORRECTION

Patent No. 3,900,660      Dated August 19, 1975

Inventor(s) H. B. Bradley

It is certified that error appears in the above-identified patent and that said Letters Patent are hereby corrected as shown below:

Column 1, line 46 of Grant, Page 3, line 9 of application, the word "meal" should read --metal--.

Column 4, line 10 of Grant, Page 8, line 20 of application, the word "condensors" should read --condensers--.

Column 4, line 61 of Grant, Page 10, line 11 of application, the word "a" should read --as--.

Column 6, line 32 of Grant, Page (Preliminary Amendment) substitute claim 5 as claim 1, the word "deposition" should read --decomposition--.

Column 6, line 36 of Grant, (Preliminary Amendment Line 10) the word "deposition" should read --decomposition--.

Column 6, line 37 of Grant, Claim 1 (Preliminary Amendment) the word "dichlorsilane" should read --dichlorosilane--.

Signed and Sealed this seventeenth Day of February 1976

[SEAL]

Attest:

RUTH C. MASON
*Attesting Officer*

C. MARSHALL DANN
*Commissioner of Patents and Trademarks*